US005611298A

United States Patent [19]
Sporn

[11] Patent Number: 5,611,298
[45] Date of Patent: *Mar. 18, 1997

[54] CONTROLLABLE DOG HARNESS AND LEASH ASSEMBLY

[76] Inventor: Joseph S. Sporn, 274 W. 86th St., New York, N.Y. 10024

[ * ] Notice: The term of this patent shall not extend beyond the expiration date of Pat. No. 5,329,885.

[21] Appl. No.: 497,081

[22] Filed: Jun. 30, 1995

Related U.S. Application Data

[63] Continuation-in-part of Ser. No. 222,034, Apr. 4, 1994, Pat. No. 5,485,810, which is a continuation of Ser. No. 194,720, Feb. 10, 1994, Pat. No. 5,359,964, which is a continuation-in-part of Ser. No. 23,638, Feb. 26, 1993, Pat. No. 5,329,885.

[51] Int. Cl.$^6$ ..................................................... A01K 27/00
[52] U.S. Cl. ........................................... 119/792; 119/864
[58] Field of Search .................................... 119/792, 863, 119/864, 856, 905, 907; 54/24, 6.1

[56] References Cited

U.S. PATENT DOCUMENTS

| | | | |
|---|---|---|---|
| 1,278,021 | 9/1918 | Robinson | 54/24 |
| 2,233,397 | 3/1941 | Bloom | 119/907 X |
| 5,329,885 | 7/1994 | Sporn | 119/864 |
| 5,503,113 | 4/1996 | Knight | 119/856 |

FOREIGN PATENT DOCUMENTS

| | | | |
|---|---|---|---|
| 4235782 | 5/1993 | Germany | 119/907 |

*Primary Examiner*—Robert P. Swiatek
*Assistant Examiner*—Yvonne R. Abbott
*Attorney, Agent, or Firm*—Michael Ebert

[57] ABSTRACT

A leash-controllable dog harness and leash assembly adapted to inhibit a dog from straining against a leash held by an individual walking the dog. The harness includes a shoulder junction having a pair of slide openings therein overlying the dog's shoulder intermediate its left and right forelegs, each having a crotch leading to a sensitive pit, a chest junction lying adjacent the dog's chest intermediate its left and right forelegs, and a pair of harness straps extending between the shoulder and chest junctions on opposite sides of the dog to conform the harness to the body of the dog. Left and right restraint straps extending from the chest junction pass through the corresponding foreleg crotches and then through the opening in the shoulder junctions to terminate in a link coupling the harness to the leash. When the leash is strained, the restraint straps linked thereto are caused to ride up the crotches to engage the sensitive foreleg pits and impose pressure thereon inducing the dog to relieve this pressure by slowing down or coming to a halt to loosen the cables.

9 Claims, 3 Drawing Sheets

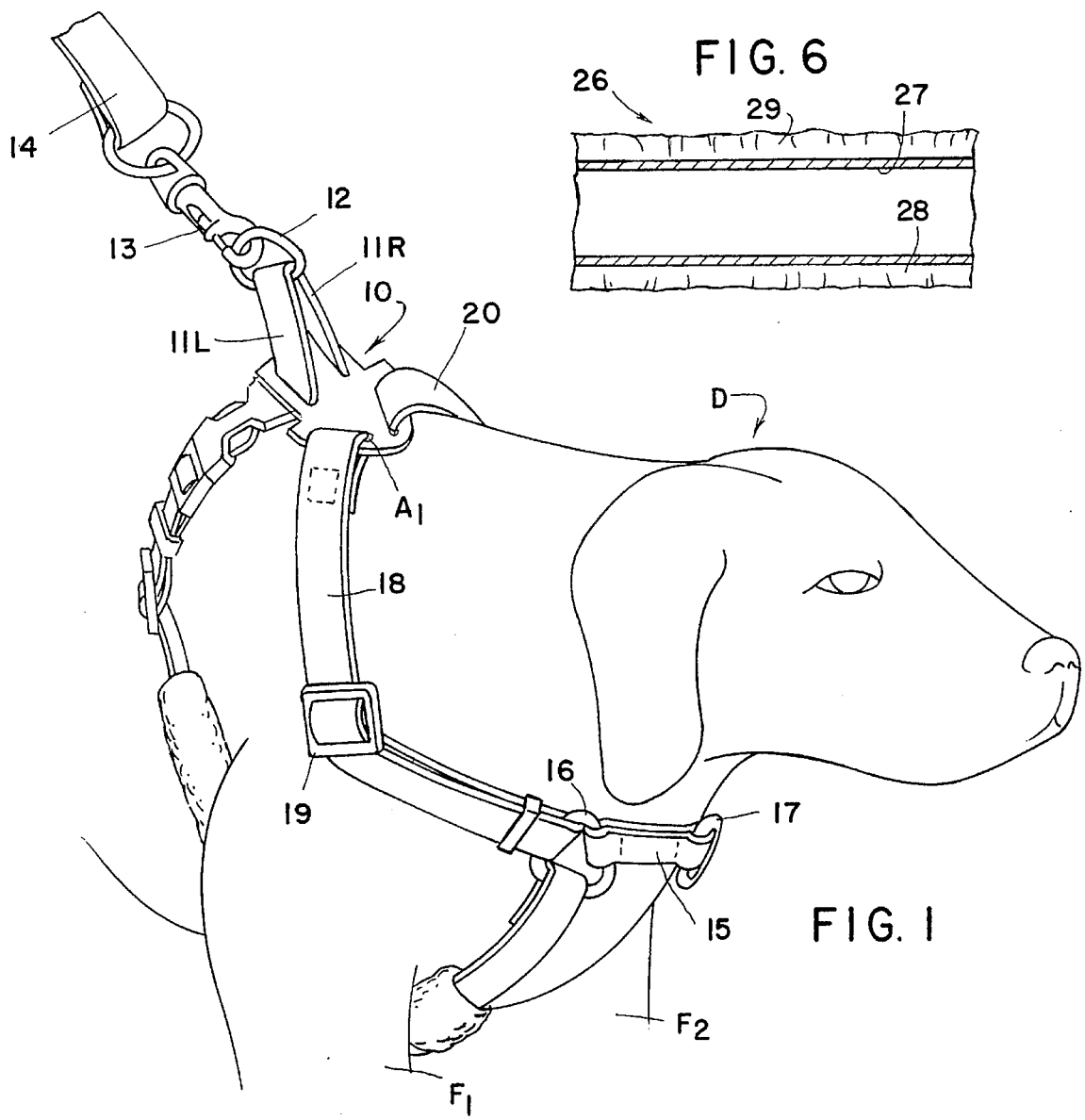
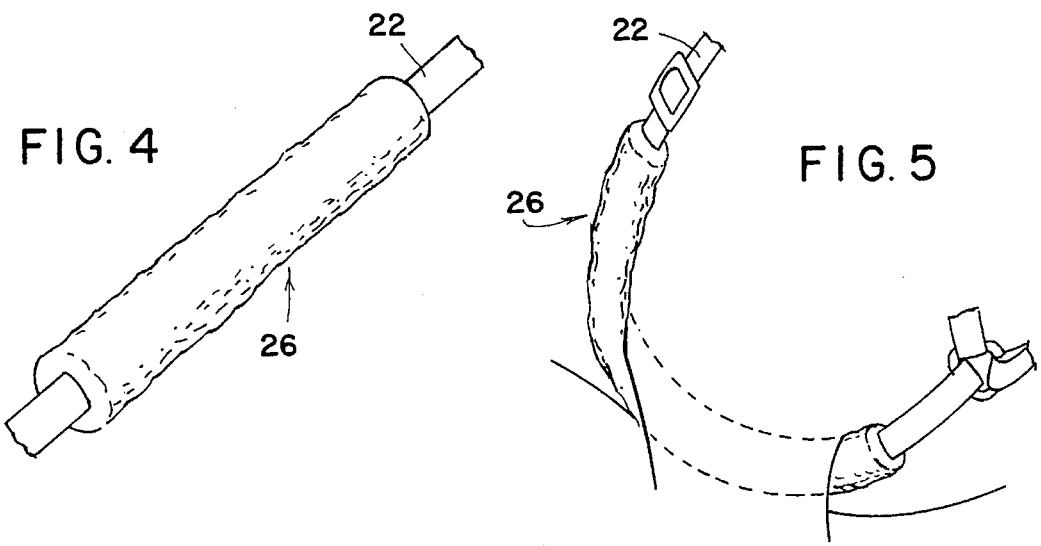

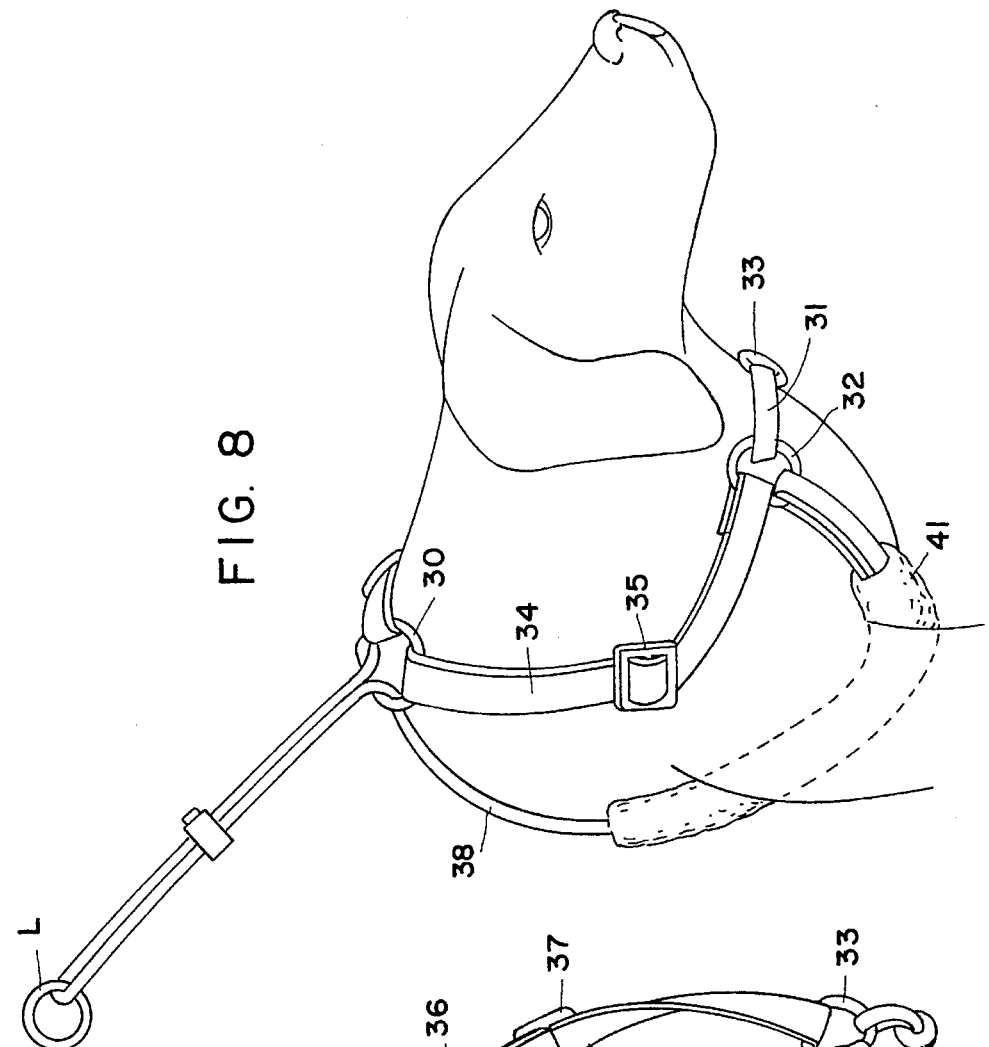
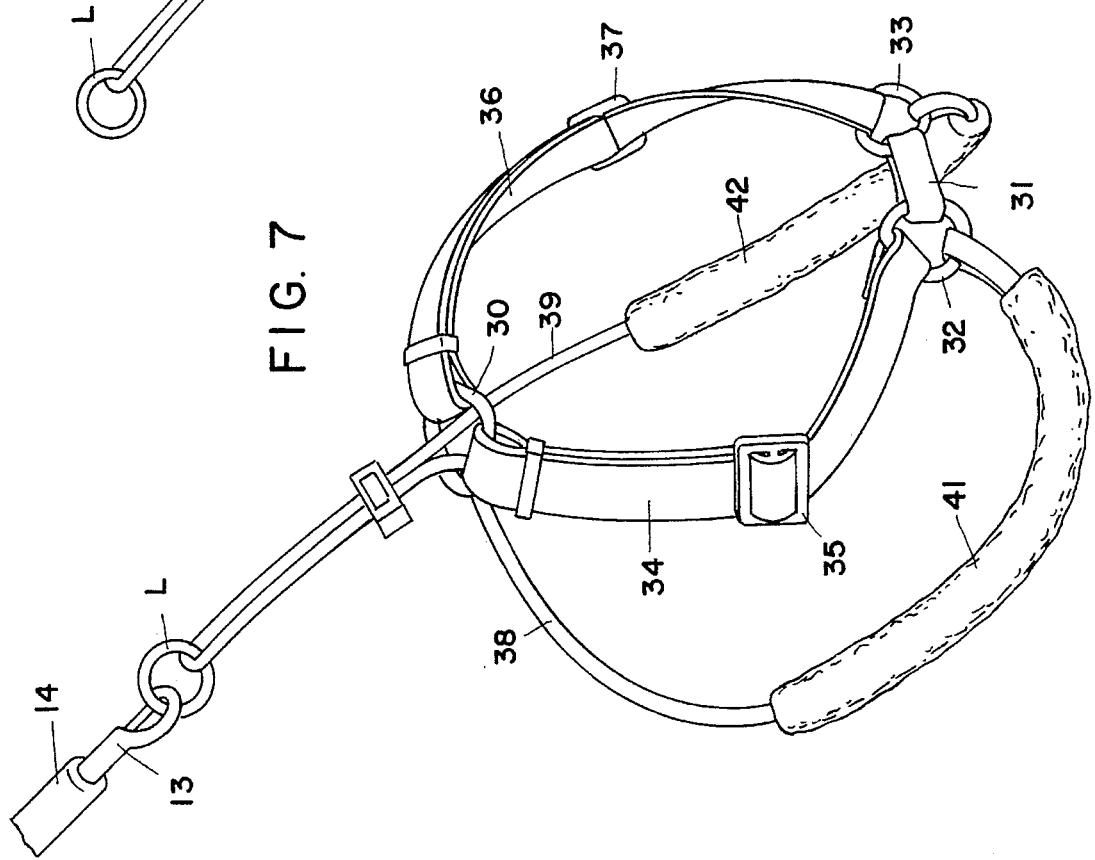

CONTROLLABLE DOG HARNESS AND LEASH ASSEMBLY

RELATED APPLICATIONS

This application is a continuation-in-part of application Ser. No. 222,034 filed Apr. 4, 1994 which issued as U.S. Pat. No. 5,485,810 on Jan. 23, 1996, which in turn is a continuation of Ser. No. 194,720 filed Feb. 10, 1994 (now U.S. Pat. No. 5,359,964), this being a continuation-in-part of Ser. No. 023,638, filed Feb. 26, 1993 (now U.S. Pat. No. 5,329,885).

BACKGROUND OF INVENTION

1. Field of the Invention

This invention relates generally to a dog harness which is connected to a leash held by an individual walking the dog, and more particularly, to a controllable dog harness and leash assembly adapted to inhibit the dog from straining against the leash and inducing the dog to come to a halt or to walk at a pace acceptable to the leash holder.

2. Status of Prior Art

A leash is a chain or strap attached to the collar or harness of a dog, the leash being used to lead the dog or to hold it in check.

As pointed out in the Bloom U.S. Pat. No. 2,233,397, when a dog strains against a leash attached to a dog harness, it is important that the harness then avoid a choking effect on the throat of the dog or undue pressure on throat muscles, cords and nerves, for these may have adverse effects on the lungs and heart of the dog. While Bloom discloses a non-choking harness, this harness does not act to discourage the dog from straining against the leash. Indeed, because the harness is non-choking, there is nothing to inhibit such straining and to hold the dog in check.

The need exists, therefore, for a harness to break older dogs of the habit of straining at the leash and for training younger dogs not to strain at the leash. When a dog strains at the leash, it may, in doing so, wrest the leash from the hands of its master who then loses control of the dog. But this is perhaps a less objectionable aspect of straining, for in the case of a master of advanced years or in relatively weakened condition, should the master hold tightly onto the strained leash to maintain control of the dog, the master may then be pulled to the ground or otherwise upset, with possibly damaging consequences.

To prevent straining at the leash, hobble-type dog harnesses are known, such as the hobble harness disclosed in the Patience et al. U.S. Pat. No. 2,670,712, which normally permits free movement of the animal but which restricts the action of the forelegs when the dog attempts to run away or otherwise go out of control.

The Patience et al. harness includes a conventional dog collar and a shoulder strap that has hoops at its opposite ends that loosely fit over the forelegs of the dog. The shoulder strap is adjustable so that the foreleg hoops can be drawn up but not so tightly as to interfere with normal movement of the dog's forelegs. However, if the dog strains on the leash, this strain is also exerted on the shoulder strap, and the foreleg hoops are then drawn upwardly so that movement of the forelegs is restrained and the dog will be brought to a halt.

A harness of the Patience et al. type imposes a physical restraint on the forelegs, and its effectiveness depends on the strength of the dog. Thus with a small dog, this harness may be fully effective, but with a large and more powerful dog, the harness may fail to restrain the dog, particularly if he succeeds in wresting the leash from the hands of his master.

My prior Sporn U.S. Pat. No. 4,964,369, discloses a dog harness acting to inhibit the dog from straining against the leash without, however, producing a choking action. The harness comprises a collar encircling the neck of the dog, and left and right restraint cables whose leading ends are connected to the front section of the collar at left and right positions thereon. The restraint cables go loosely under the left and right foreleg pits of the dog and through respective slip rings attached to the rear section of the collar, the trailing ends of the cables terminating in a coupler to which the leash is attached.

When the harnessed dog strains at the leash, this acts to tighten the restraint cables which then impose a pressure on the foreleg pits. Because these pits are highly sensitive, the dog, in order to relieve this pressure, will then cease to strain against the leash and thereby again loosen the restraint cable. While a harness of the type disclosed in my prior '369 patent is effective for its intended purpose, it requires a collar whose size is appropriate to the neck size of the dog on which it is installed.

My above-identified copending patent applications and my prior U.S. Pat. Nos. 5,359,964 and 5,329,885 disclose a collarless leash-controllable dog harness adapted to inhibit a dog from straining against the leash held by an individual walking the dog, the harness inducing the dog to come to a halt or to walk at a pace acceptable to the leash holder.

In this collarless harness, the straps and cables which from the harness run between a shoulder junction overlying the shoulder of the dog and a chest junction lying adjacent the chest. When this harness is installed on a dog, one harness strap passing through the right foreleg crotch, the other strap running through the left foreleg crotch. Should the harnessed dog strain against the leash, this causes both straps to ride up the respective crotches to impose pressure on the highly-sensitive foreleg pits, whereby in order to relieve the resultant discomfort, the dog then relaxes the strain.

The harnesses disclosed in my copending applications and in my prior U.S. Pat. Nos. 5,359,964 and 5,329,885 have distinct advantages over that disclosed in my prior '369 patent, for it does not entail a collar. But in both instances, control of the dog is effected by applying pressure to the highly-sensitive foreleg pits which induces the dog to relax the strain on the leash.

SUMMARY OF INVENTION

In view of the foregoing, the main object of this invention is to provide an improved leash-controllable dog harness and leash assembly of relatively simple and inexpensive design adapted to apply pressure to the highly-sensitive pits of the dog's forelegs and thereby inhibit the harnessed go from taking any action not acceptable to the holder of the leash.

Among the significant features of an improved leash-controllable dog harness in accordance with the invention are the following:

A. The harness includes no neck collar that must be fitted to the neck of the dog being harnessed;

B. The harness does not physically restrain or hobble foreleg movement of the dog;

C. The effectiveness of the harness does not depend on the size and strength of the dog or on its breed, for it is effective on all dogs of all breeds; and D. The harness lends itself to color and fabric coordination of the leash and the harness to provide a fashion or designer assembly.

More particularly, an object of this invention is to provide a harness of the above type which includes a pair of restraint straps which pass through the respective foreleg crotches of the harnessed dog and are coupled to a leash whereby when the leash is strained, the cables then ride up the crotches to engage and apply pressure to the highly sensitive foreleg pits.

Still another object of the invention is to provide a leash-controllable harness that includes straps of adjustable length formed of high-strength fabric webbing and restraints cables formed of a braided fabric so that the harness which is comfortable to wear may be quickly installed on the dog, and may be mass-produced at relatively low cost.

Yet another object of this invention is to provide soft, protective sleeves for the restraint straps of the harness which prevent the cables sliding through the sleeves from chafing or otherwise irritating the dog.

Also an object of this invention is to provide a harness of the above type which is adapted to limit the amount of pressure applied to the sensitive foreleg pits to prevent undue discomfort.

Briefly stated, these objects are attained by a controllable dog harness and leash adapted to inhibit a dog from straining against a leash held by an individual walking the dog, the harness inducing the dog to come to a halt or to walk at a pace acceptable to the leash holder. The harness includes a shoulder junction having a pair of slide openings therein that overlies the dog's shoulder intermediate its left and right forelegs, each having a crotch leading to a sensitive pit, a chest junction lying adjacent the dog's chest intermediate its left and right forelegs, and a pair of harness straps extending between the shoulder and chest junctions on opposite sides of the dog to conform the harness to the body of the dog.

Left and right restraint straps extending from the chest junction pass through the corresponding foreleg crotches and then through the respective openings in the shoulder junction to terminate in a link coupling the harness to the leash. When the leash is strained, the restraint straps linked thereto are caused to ride up the crotches to engage and impose pressure on the sensitive foreleg pits, thereby inducing the dog to relieve the pressure by slowing down or coming to a halt to loosen the cables.

BRIEF DESCRIPTION OF DRAWINGS

For a better understanding of the invention as well as other objects and further features thereof, reference is made to the following detailed description to be read in conjunction with the accompanying drawings, wherein:

FIG. 1 shows a dog wearing a harness and leash assembly in accordance with a first embodiment of the invention;

FIG. 4 shows a protective sleeve for a harness cable;

FIG. 5 shows the sleeve mounted on a cable going through a foreleg crotch;

FIG. 6 is a section taken through the sleeve;

FIG. 7 shows a harness and leash assembly in accordance with a second embodiment thereof; and FIG. 8 shows a dog wearing this assembly.

DETAILED DESCRIPTION OF INVENTION

First Embodiment

Figure 2:
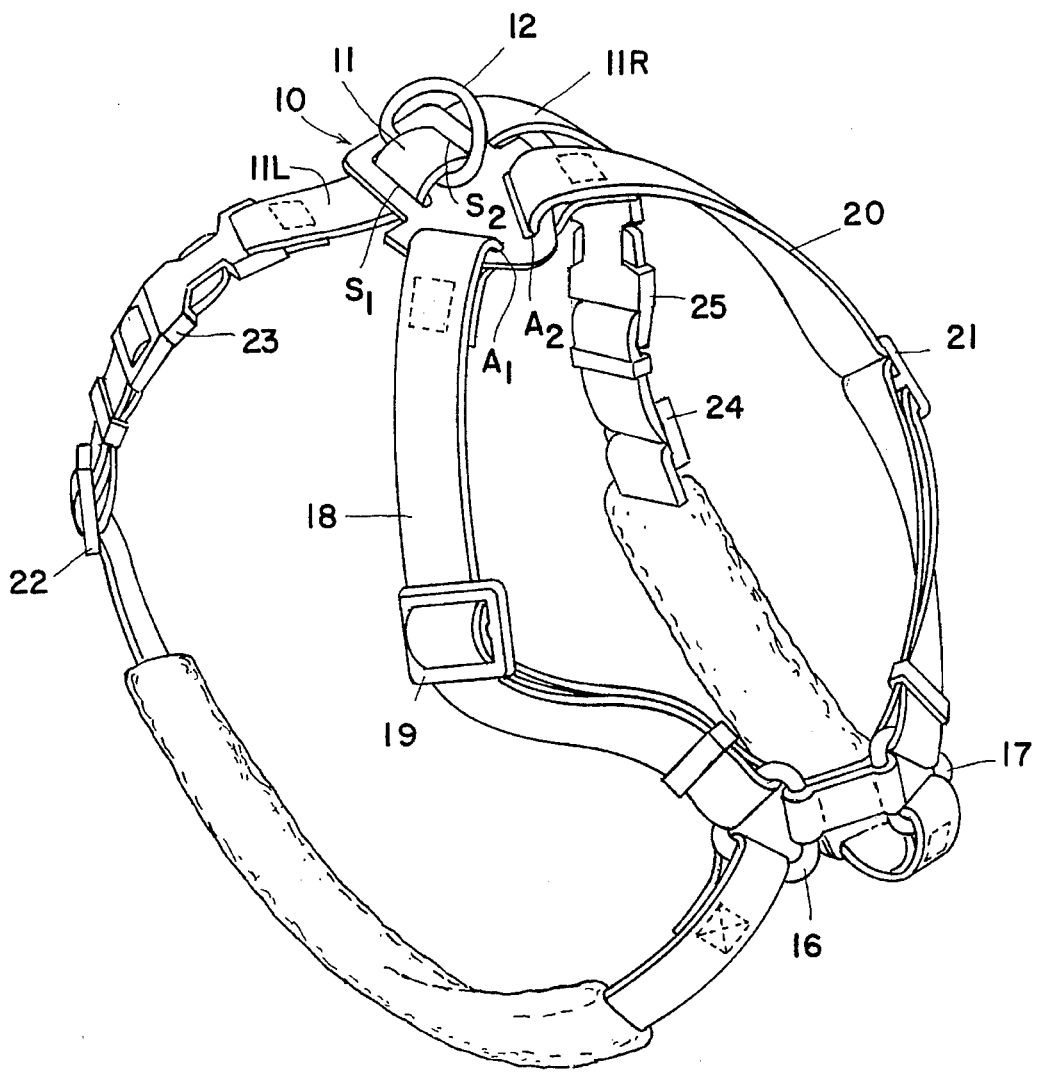
FIG. 2 separately illustrates the harness.
Figure 3:
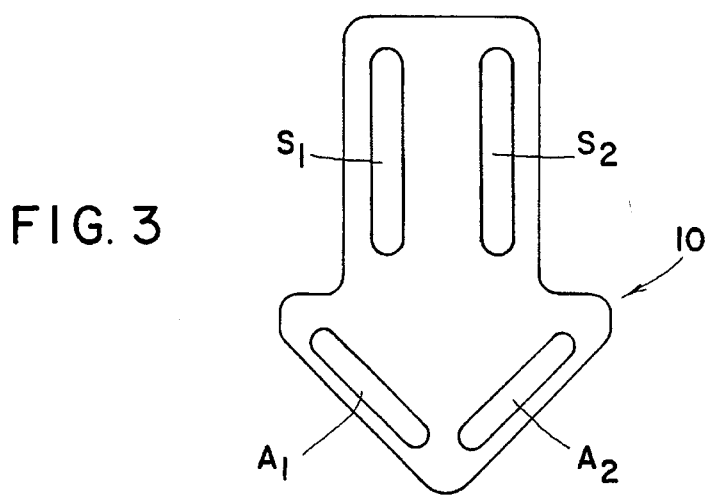
FIG. 3 shows the shoulder junction included in the harness.

Referring now to FIGS. 1, 2 and 3, there is illustrated in these figures a controllable harness and leash assembly in accordance with a preferred embodiment of the invention suitable for dogs whose sizes may range from small to large, for the harness is adjustable to the size of the dog on which it is installed.

The harness includes a shoulder junction 10, (shown separately in FIG. 3) formed of an arrow-shaped plate of brass, plastic or other suitable high-strength material. Shoulder junction 10 is provided at its narrow shaft upper zone with a pair of slide openings $S_1$ and $S_2$, and at its lower arrow zone with slots defining converging left and right side arms $A_1$ and $A_2$. When the harness is installed on a dog D, as shown in FIG. 1, shoulder junction 10 then overlies the shoulder of the dog intermediate its left and right forelegs $F_1$ and $F_2$.

Threaded through the respective slide opening $S_1$ and $S_2$ of the shoulder junction 10 are the left and right sections 11L and 11R of leash-linking strap 11 having at its midsection 11M a coupling ring 12. The left and right sections of the strap cannot be pulled through shoulder junction, for this action is blocked by midsection 11M. Coupling ring 12 as shown in FIG. 1 is linked to the retractable clasp 13 which terminates the leading end of a leash 14 formed of the same fabric webbing as that of strap 11.

Also included in a chest junction 15 formed by a short transverse fabric strap having left and right rings 16 and 17 secured to its opposite ends. When the harness is installed, chest junction 15 then lies against the chest of dog D intermediate its left and right foreleg crotches.

The left section 11L of the leash-linking strap is coupled to ring 16 of the chest junction 15 and the right section 11R is is coupled to ring 17 of this junction.

Extending between left arm $A_1$ of shoulder junction 10 and left ring 16 of chest junction 15 on one side of the dog is a fabric strap 18 provided with a tri-slide 19 that is adjustable along the strap to vary its length to accommodate the harness to the body of the dog. Obviously the bigger the dog the greater is the distance between its shoulder and chest and the greater must be the length of strap 18 which runs between the shoulder and chest junctions. Similarly, extending between right arm $A_2$ of shoulder junction and right ring 17 of the chest junction 15 on the other side of dog is a fabric strap 20 provided with a tri-slide 21 to adjust the length of this strap.

The left section 11L of the leash-linking strap 11 is provided with a tri-slide 22 to adjust the length of strap 11 and a releasable buckle 23. The right section 11R of strap 11 is provided with a tri-slide 24 and a releasable buckle 25. When released, the buckle opens up the harness so that it can be installed on the dog or taken off.

The strap sections 11R and 11L extend from the chest junction 15 to the shoulder junction 10 through the respective foreleg crotches of the dog and when the leash is strained, the leash coupling ring 12 which is joined to the midsection 11M of strap 11 causes the strap sections to ride up the foreleg crotches to engage the foreleg pits.

Buckles 23 and 25 on strap sections 11R and 11L serve a dual function, for they not only permit the user of the harness to quickly install the harness on the dog and to just as quickly detach the harness, but the buckles also function as a limit on the extent to which the strap sections can apply pressure to the foreleg pits and to thereby avoid excessive pressure which may cause undue discomfort to the dog.

When the leash is strained, coupling ring 12 is pulled away from the shoulder junction in to cause the strap sections 11R and 11L to pull out of slide openings $S_1$ and $S_2$ of the shoulder junction. When the buckles 23 and 25 on these strap sections reach the slide openings, further withdrawal of the strap sections is arrested, for the buckles are blocked by the slides openings.

Operation

When the harnessed dog is led by an individual holding leash 14 at an acceptable pace, and the walking dog does not then strain against the leash, the harness remains fairly loose and comfortable, and the strap sections 11L and 11R which act as restraint cables passing through the foreleg crotches are then disengaged from the sensitive pits of the dog's forelegs.

However, should the dog lurch ahead or seek to increase its pace so that it is moving faster than the individual walking the dog, the leash held by the individual will then be strained. This strain acts to exert a pull on strap sections 11L and 11R which will concurrently ride up the foreleg crotches to engage and press against the sensitive foreleg pits. The resultant discomfort will induce the dog to relax the strain on the leash so that the cables no longer press against the sensitive pits.

However as pointed out previously, the buckles on the strap sections limit movement of the strap sections to prevent undue discomfort.

Protective Sleeves

In the harness shown in FIG. 2 the strap sections 11L and 11R go through the left and right foreleg crotches and function as restraint cables. When the restraint cables are tightened, they rub against the surface of the dog. With continued use this action may cause chafing or irritation.

To avoid such chafing without however interfering with the ability of the harness to control the dog on which it is installed, there is mounted on each cable an elongated protective sleeve 26. This sleeve is shown in connection with strap section 11L in FIGS. 4, 5 and 6. Sleeve 26 has a tubular inner liner 27 formed of woven or knitted nylon or similar smooth fabric material, on which is secured an outer coat 28 of Sherpa, cashmere wool or other soft, non-abrading material.

The inner liner 27 of the sleeve is preferably fabricated of stretchable material so that when mounting the sleeve on a strap, the sleeve can expand to allow a slide or any other element mounted on the strap to pass through the sleeve.

Designer Assembly

All straps included in the harness shown in FIG. 1 are made of a fabric webbing of the same width, and the leash is also made of fabric webbing of the same width so that the harness and the leash are decoratively coordinated. In practice, the straps including the leash strap may have the same color or of contrasting colors. Or the straps may exhibit multi-colored decorative patterns.

Second Embodiment

This embodiment, illustrated in FIGS. 7 and 8, is a highly simplified and inexpensive version of the first embodiment and may therefore be manufactured at low cost.

In the second embodiment, the shoulder junction of the harness which overlies the dog's shoulder between the left and right forelegs takes the form of a metal D ring 30 having an opening therein banked by left and right arms. The chest junction which lies adjacent the chest of the dog intermediate the left and right foreleg crotches is formed by a short fabric strap 31 having secured to its opposite ends left and right metal coupling rings 32 and 33 similar to the D ring forming the shoulder junction.

Secured to and extending between the left arm of the shoulder junction ring 30 and the left coupling ring 32 of the shoulder junction is a fabric strap 34 provided with a tri-slide 35 adjusting the length of the strap to a length appropriate to the size of the harnessed dog. Secured to and extending between the right arm of the shoulder junction ring 30 and the right coupling ring 33 of the chest junction is a fabric strap 36 provided with a tri-slide 37 for adjusting the length of this strap. When the harness is installed, straps 34 and 30 then lie against opposite sides of the dog, with the head of the dog being received in the open region between the straps whereby the harness is conformed to the body of the dog.

A long braided fabric cable is folded in half, a link L being placed in the cable at its fold. Coupled to link L is the retractable clasp 13 which terminates the leading end of leash 14, as in the first embodiment.

The folded cable defines left and right restraint cables 38 and 39. The leading end of left restraint cable 38 is secured to left coupling ring 32 of chest junction 31 and passes through the left foreleg crotch of the dog, and then through the opening in the shoulder junction ring 30 to terminate in link L. The leading end of right restraint cable 39 is secured to right coupling ring 33 of the chest junction and passes through the right foreleg crotch of the dog and then through the opening in shoulder junction righ 30 to terminate in link L.

The left and right restraint cables 38 and 39 in the sections thereof between link L and shoulder junction ring 30 are clamped together by a retractable clamp 40.

The position of the clamp along the left and right restraint cables sections is adjusted to provide restraint cables of an effective length appropriate to the size of the dog. Also provided, as on the first embodiment, are left and right protective sleeves 41 and 42.

In operation, when the leash is pulled by its holder to control the dog, this action causes the restraint cables to ride up the foreleg crotches to engage the sensitive foreleg pits to induce the dog to relieve the pressure on the pits by slowing down or coming to a halt. Thus a strong tug on the leash will cause the dog to come to an immediate halt.

While there have been shown preferred embodiments of the invention, it is to be understood that many changes may be made thereon within the spirit of the invention.

I claim:

1. A dog harness and leash assembly for controlling a dog, comprising:

A. a shoulder junction adapted to overlie the shoulder of the dog intermediate its right and left forelegs each having a crotch leading to a sensitive pit, said shoulder junction having a pair of slide openings;

B. a chest junction adapted to lie adjacent the chest of the dog intermediate the foreleg crotches;

C. a pair of harness straps extending from the shoulder junction to the chest junction on opposite sides of the dog to conform the harness to the dog;

D. a leash-linking strap having a fold defining left and right sections which are threaded through the pair of slide openings in the shoulder junction and pass through the right and left foreleg crotches to terminate at said chest junction, the fold in said strap being provided with a link that is coupled to said leash whereby when the leash is strained, the strap section ride up the crotches to engage the sensitive pits to apply pressure thereto inducing the dog to slow down or come to a halt.

2. A harness and leash assembly as set forth in claim 1, in which the pair of harness straps, the leash-linking strap and the leash are all formed of fabric webbing having the same width whereby the leash is decoratively coordinated with the harness.

3. A harness and leash assembly as set forth in claim 1, in which the leash and the harness straps are color coordinated.

4. A harness as set forth in claim 1, in which the chest junction is formed by a short transverse strap having left and right connecting rings at its opposite ends, the harness straps extending from the shoulder junction being respectively joined to said left and right connecting rings.

5. An assembly as set forth in claim 1, in which each of said harness straps is provided with a tri-slide to adjust its length.

6. An assembly as set forth in claim 1, in which said left and right sections of the leash-linking strap are each provided with a releasable buckle.

7. An assembly as set forth in claim 6, in which the each of said left and right sections is also provided with a tri-slide to adjust its length.

8. An assembly as set forth in claim 1, in which the leash terminates in a retractable clasp that engages said link.

9. An assembly as set forth in claim 1, in which the shoulder junction is defined by an arrow-shaped plate provided with a narrow shaft having said pair of slide openings and with a triangular arrow zone having left and right side arms to which said harness straps are joined.

\* \* \* \* \*